United States Patent [19]
Claussen et al.

[11] Patent Number: 5,957,552
[45] Date of Patent: Sep. 28, 1999

[54] VEHICLE WITH BRAKE FORCE REGULATIONS ON GRADIENT

[75] Inventors: Heiko Claussen, Hannover; Jürgen Eickhoff, Walsrode, both of Germany

[73] Assignee: WABCO GmbH, Hannover, Germany

[21] Appl. No.: 08/932,260

[22] Filed: Sep. 17, 1997

[30] Foreign Application Priority Data

Sep. 13, 1996 [DE] Germany .............. 196 37 297

[51] Int. Cl.$^6$ .................................................. B60T 8/26
[52] U.S. Cl. .......................................... 303/192; 303/9.67
[58] Field of Search ................................ 303/186, 113.5, 303/192, 9.62–9.76

[56] References Cited

U.S. PATENT DOCUMENTS

| | | | |
|---|---|---|---|
| 4,331,364 | 5/1982 | Koshimizu et al. | 303/9.67 |
| 4,852,950 | 8/1989 | Murakami | 303/192 |
| 5,043,896 | 8/1991 | Sol | 303/192 |

FOREIGN PATENT DOCUMENTS

| | | |
|---|---|---|
| 24 19 242 A1 | 10/1975 | Germany . |
| 31 47 598 A1 | 8/1982 | Germany . |
| WO 96 11 826 A1 | 4/1996 | WIPO . |

*Primary Examiner*—Matthew C. Graham
*Attorney, Agent, or Firm*—Proskauer Rose LLP

[57] ABSTRACT

A process is disclosed for adjusting the speed of a vehicle travelling on a gradient to a predetermined desired speed, wherein the vehicle is equipped with an ABS and/or ASR system, comprises determining the actual speed of the vehicle travelling on a gradient, determining a control deviation for the vehicle, the control deviation being the difference between the actual speed of the vehicle and the desired speed, and actively applying the brakes of the vehicle when the control deviation is greater than a predetermined amount. Only the brakes of the downhill axle are braked so long as the control deviation is less than a predetermined control deviation, or so long as the slip of the braked wheels are less than a predetermined slip. The brakes of the uphill axle are applied only if the predetermined control deviation is exceeded.

7 Claims, 1 Drawing Sheet

VEHICLE WITH BRAKE FORCE REGULATIONS ON GRADIENT

BACKGROUND OF THE INVENTION

The present invention relates to a road vehicle having an anti-lock braking system (ABS) and/or an automatic slip control (ASR) for which the travelling speed on a gradient can be adjusted to a predetermined desired speed by means of an active, electronically controlled brake application.

Road vehicles having systems that maintain the vehicle at a constant speed as it travels on a gradient by automatically applying the brakes ("active braking") are known. Such vehicles are, as a rule, equipped with an anti-locking brake system (ABS), as well as with an automatic slip control (ASR). The components of the ABS and ASR systems, such as the electronic control units, wheel speed sensors, solenoid regulating valves, etc., are used to effect the above-mentioned speed regulation on a gradient. Using the known devices, the driver is relieved from having to actuate the brake pedal constantly when the vehicle is travelling on a gradient. Even with a changing incline, uniform speed is maintained.

In DE-A-24 19 242, an electro-pneumatic brake force control circuit is disclosed that maintains a constant vehicle speed as the vehicle travels on a gradient through active braking so long as neither the gas pedal nor the brake pedal is actuated. The speed regulation on a gradient is switched off immediately when either the brake pedal or the gas pedal is actuated, or as soon as the superimposed ABS becomes activated.

Equipping a vehicle with a "hill descent control mode" is also known from International Patent Application WO 96/11826 A1. This type of speed regulation on a gradient can be switched on manually by the driver with the activation of a switch. This type of regulation is able to maintain the vehicle at a constant speed on a gradient by means of active regulated braking of the vehicle without the driver having to actuate the brake. This system is particularly suitable for off road vehicles.

A disadvantage in the known systems is that due to the weight shift to the downhill axle which occurs when the vehicle is travelling on a gradient, the wheels of the downhill axle are insufficiently braked and the wheels of the uphill axle are excessively braked when the brake cylinders are subjected to the same braking pressure. This may lead to unnecessary activation of the ABS due to the locking of the relieved wheels of the uphill axle.

SUMMARY OF THE INVENTION

It is the object of the present invention to provide an improved road vehicle equipped with an ABS and/or an ASR system, which is adapted for an active brake control during travel on a gradient, and which does not suffer from the above mentioned disadvantages.

This object is achieved in a road vehicle of the aforementioned kind wherein a control deviation is calculated, the control deviation being the difference between the actual speed of the vehicle travelling on a gradient and a predetermined desired speed, and wherein only the wheels on the downhill axle are braked so long as the control deviation is less than a predetermined amount, or so long as the slip of the braked wheels is less than a predetermined amount.

In a preferred embodiment, a control deviation of about ±0.5 km/h is assigned to the wheels of the downhill axle, while a control deviation of about ±0.7 km/h is assigned to the wheels of the uphill axle. The wheels of these axles are braked only when their respective deviations are exceeded.

Because pressure is alleviated from the wheels of the uphill axle according to the invention during regulated gradient travel, especially on a smooth road surface or on very steep stretches of the road, the stability of the vehicle is enhanced since the wheels of the uphill axle are mostly freed of brake duty. The wheels of the uphill axle are thus able to contribute fully to the lateral guidance of the vehicle and thereby contribute to its travel stability. The disadvantage of greater or uneven wear of the brake linings of the downhill wheels which occurs with the present invention is acceptable since travel safety has priority in every instance.

DETAILED DESCRIPTION OF THE INVENTION

Figure 1:
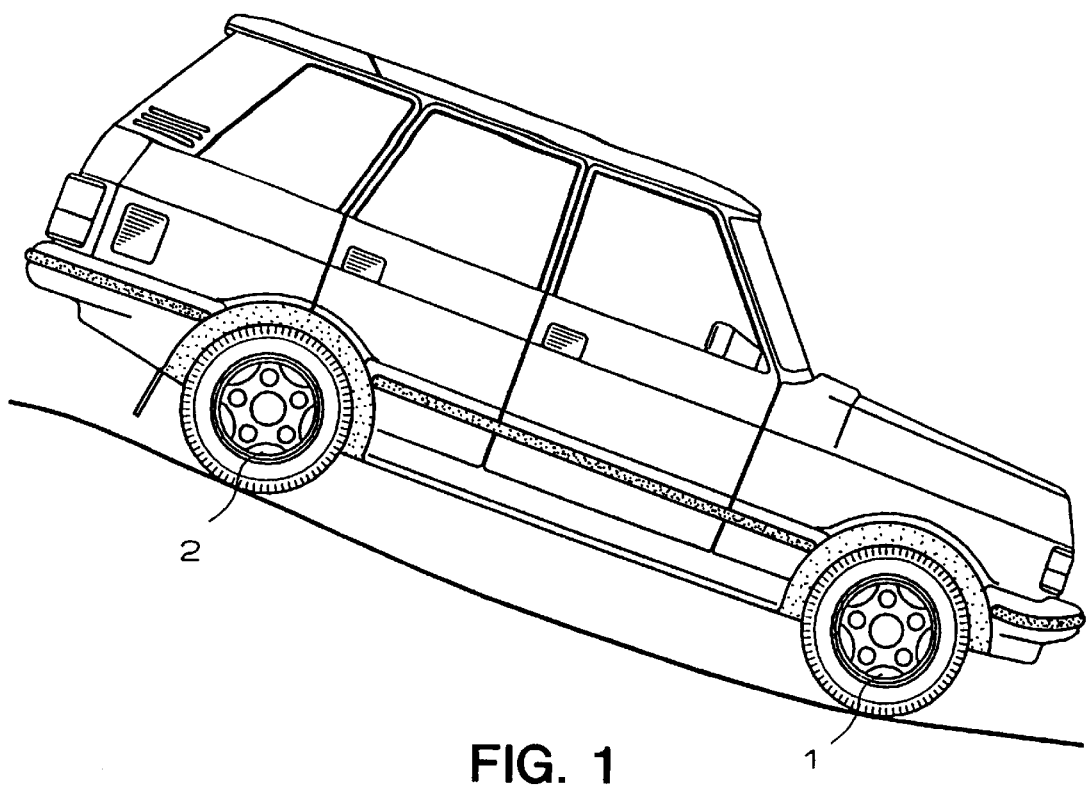
FIG. 1 shows a vehicle on a gradient.

The vehicle illustrated in FIG. 1 has two axles (1) and (2), of which the front axle (1) is considered the lower or downhill axle and rear axle (2) is considered the higher or uphill axle. The vehicle may travel forward or backwards on the gradient.

Figure 2:
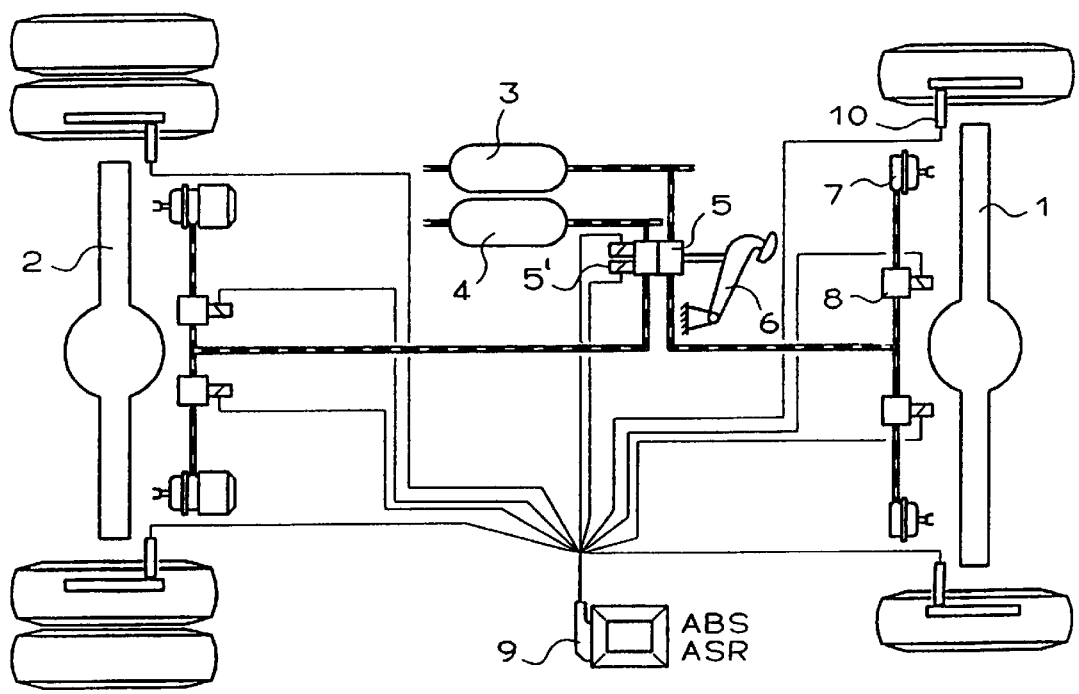
FIG. 2 shows a schematic diagram of the pneumatic and the electronic systems of a vehicle equipped with inventive speed regulation system.

FIG. 2 schematically shows the electronic and pneumatic systems of the vehicle illustrated in FIG. 1. In another embodiment, the pneumatic braking system shown here is replaced by a hydraulic or mixed braking system.

The vehicle shown in FIG. 2 has the two axles (1) and (2). The pressure medium for the braking system is supplied to the axles (1) and (2) by two pressure supply tanks (3, 4), one for each axle. The pressure medium is conveyed to the wheel brake cylinders (7) via a brake valve (5) which is actuated by a brake pedal (6). Disposed before the brake cylinders (7) are the ABS/ASR control solenoid valves (8). The brake valve (5) is provided with an ASR solenoid valve (5'), as brake pressure is applied to the individual wheels without the brake pedal (6) being pressed when the ASR is activated.

To control the above-mentioned solenoid valves, an ABS/ASR electronic control unit (9) is provided. The ABS/ASR electronic control unit system (9) is connected by electrical connection lines to the above-mentioned solenoid valves (5, 5', 8). The electronic control unit (9) obtains behavioral information for each individual wheel from wheel sensors (10). In FIG. 2, pneumatic or hydraulic lines are shown by black/white lines while electrical lines are shown as thin continuous black lines.

The manner in which the system functions during regulated downhill travel is explained below in further detail.

Downhill travel of the vehicle is recognized either automatically by the electronic control unit (9), or when the driver manually activates a switch (not shown). Upon activation of the automatic downhill travel control, the ASR solenoid valve (5') becomes activated and direct braking pressure is brought to bear upon the brake cylinders (7) of the wheels of the front axle (1). At this stage, the electronic control unit (9) regulates the speed of the vehicle by actuating the solenoid valves (8) of the ABS system in such a manner that a predetermined speed is maintained independently of any changes in the gradient.

According to the invention, braking pressure is no longer distributed evenly to all wheels of the vehicle, as in the known art. Instead, braking pressure is applied to the wheels of the downhill axle (1) either exclusively or to a greater extent than is applied to the wheels of the uphill axle (2), while the wheels of the uphill axle (2) are relieved of braking pressure. This is achieved by actuating the ASR solenoid valve (5') in such a manner that the wheels of the downhill axle (1) are supplied with braking pressure exclusively or to a greater extent than the wheels of the uphill axle (2). The same operation can also be achieved using the ABS control valves (8).

When the vehicle is travelling on a gradient and the active braking intervention is in operation, only the wheels of the downhill axle (1) are braked, so long as the control deviation between the actual speed of the vehicle and the desired speed is nearly zero, or so long as only minimal slip of the braked wheels occur. The minimal permissible control deviation in such case is approximately 0 to 2 km/h and the minimal permissible slip is approximately 0 to 5%. If the upper limits of these ranges are exceeded, the wheels of the uphill vehicle axle are also subjected to braking pressure.

The described effect of uneven braking distribution, with an emphasis on the front or downhill axle (1), can also be achieved if the front axle (1) operates within a smaller regulating range than the rear axle (2). This can be achieved, for example, if a control deviation of ±0.5 km/h is tolerated for the front (downhill) axle (1) before active braking is applied, while a control deviation of ±0.7 km/h is tolerated for the rear (uphill) axle (2) before active braking is applied there. As a result, only the brakes of the downhill axle (1) are used for braking on gradients which are not too steep, while on steeper gradients, braking is done mainly with the wheels of the downhill axle.

Alternatively, it is also possible to effect the desired braking force distribution during operation by means of active brake application in which the brakes of the downhill vehicle axle (1) are braked by a fixed percentage above the brakes of the uphill axle (2). In this case, the ratio of braking forces between the downhill axle (1) and the uphill axle (2) may be approximately 70% to 30%. This ratio may vary depending on the type of the vehicle.

By means of a separate gradient indicator (not shown) or by comparing the slip of the wheels, the electronic control unit (9) recognizes which of the two axles is the downhill one. The above-mentioned slip comparison is possible since the wheels of the uphill axle have more slip when constant brake pressure is applied because they bear a lesser load. By using such a slip comparison, it is possible to dispense with a separate gradient indicator.

The same inventive brake operation functioning also applies when the vehicle travels in reverse on a gradient.

As soon as a wheel is about to lock in the course of regulated downhill travel, the inventive brake operation is replaced by the normal ABS function. The inventive brake operation is also suspended when the driver wishes to reduce or increase the previously regulated constant speed and actuates either the brake pedal or the gas pedal.

In order to avoid overheating of the brakes during a long downhill descent, it is advantageous to monitor the temperature of the brakes and alert the driver when the temperature of the brakes exceeds a set value using a warning system. When the warning system is activated, the driver then has the opportunity to stop the vehicle to allow the brakes to cool down. This kind of monitoring of the brake temperature can be achieved either by means of temperature sensors (not shown) on the wheel brakes, or by means of an electronic simulation of the brakes within the electronic control unit (9). Although the second alternative is less precise, it is more economical.

Considerable improvement of vehicle stability is achieved by means of the above-described improved brake control when travelling on a gradient, without requiring substantially more hardware, i.e., only by suitable additional reprogramming of the already existing ABS/ASR electronic control unit (9).

The person skilled in the art recognizes that the embodiments described above and the above-mentioned possibilities for designs do not exhaust the area of protection of the invention, but that all embodiments with characteristics as mentioned in the claims fall under their protection.

We claim:

1. A process for adjusting the speed of a vehicle travelling on a gradient to a predetermined desired speed, wherein said vehicle is equipped with an ABS or ASR system, comprising determining the actual speed at which said vehicle is traveling on said gradient, determining a control deviation for said vehicle, said control deviation being the difference between said actual speed of said vehicle and said desired speed, actively applying the brakes of said vehicle when the control deviation is greater than a predetermined amount, wherein only the brakes of the wheels located on the downhill axle of said vehicle are braked so long as said control deviation is less than a predetermined control deviation, or so long as the slip of the braked wheels is less than a predetermined slip.

2. The process of claim 1 wherein said predetermined control deviation is approximately 0 to 2 km/h.

3. The process of claim 1 wherein said predetermined slip is approximately 0 to 5%.

4. The process of claim 1 wherein a control deviation of ±0.5 km/h is assigned to the wheels on the downhill axle, and a control deviation of ±0.7 km/h is assigned to the wheels on the uphill axle, said wheels on the downhill and on the uphill axles being braked only when their respective control deviations are exceeded.

5. The process of claim 1, further comprising monitoring the temperature of at least the brakes on the downhill axle and emitting a warning signal when the temperature exceeds a fixed limit.

6. A process for adjusting the speed of a vehicle travelling on a gradient to a predetermined desired speed, wherein said vehicle is equipped with an ABS or an ASR system, comprising determining the actual speed at which said vehicle is travelling on the gradient, determining a control deviation for said vehicle, said control deviation being the difference between said actual speed of said vehicle and said desired speed, actively applying the brakes of said vehicle when the control deviation is greater than a predetermined amount, distributing the brake force during said active brake application so that the brake force applied to the brakes on the downhill axle is greater than the brake force applied to the brakes of the uphill axle by a fixed percentage, and monitoring the temperature of at least the brakes of the downhill axle and emitting a warning signal when the temperature exceeds a fixed limit.

7. The process of claim 6 wherein the ratio of brake forces applied to the downhill axle and to the uphill axle is about 70% to 30%.

* * * * *